(12) United States Patent
Florexil

(10) Patent No.: US 10,453,459 B2
(45) Date of Patent: Oct. 22, 2019

(54) INTERPRETING ASSISTANT SYSTEM

(71) Applicant: Saida Ashley Florexil, West Palm Beach, FL (US)

(72) Inventor: Saida Ashley Florexil, West Palm Beach, FL (US)

( * ) Notice: Subject to any disclaimer, the term of this patent is extended or adjusted under 35 U.S.C. 154(b) by 0 days.

(21) Appl. No.: 15/885,168

(22) Filed: Jan. 31, 2018

(65) Prior Publication Data
US 2018/0374483 A1 Dec. 27, 2018

Related U.S. Application Data

(60) Provisional application No. 62/604,022, filed on Jun. 21, 2017.

(51) Int. Cl.
| | | |
|---|---|---|
| *G10L 15/26* | (2006.01) | |
| *G06F 1/16* | (2006.01) | |
| *H04M 1/725* | (2006.01) | |
| *G06F 17/28* | (2006.01) | |
| *G09B 21/00* | (2006.01) | |

(52) U.S. Cl.
CPC ............ *G10L 15/265* (2013.01); *G06F 1/163* (2013.01); *G06F 17/28* (2013.01); *G06F 17/289* (2013.01); *G09B 21/009* (2013.01); *G10L 15/26* (2013.01); *H04M 1/7253* (2013.01); *H04M 1/72591* (2013.01); *H04M 2250/58* (2013.01)

(58) Field of Classification Search
CPC ..... G10L 15/26; G10L 15/265; G10L 15/005; G10L 15/00; G10L 15/20; G09B 21/009; H04M 1/7253; G06F 1/163; G06F 16/3337; G06F 17/28–289; G06F 17/2809
See application file for complete search history.

(56) References Cited

U.S. PATENT DOCUMENTS

| | | | | |
|---|---|---|---|---|
| 10,074,381 | B1* | 9/2018 | Cowburn | G06F 17/2785 |
| 2007/0225973 | A1* | 9/2007 | Childress | G10L 25/87 |
| | | | | 704/211 |
| 2008/0077387 | A1* | 3/2008 | Ariu | G06F 17/289 |
| | | | | 704/3 |
| 2010/0169073 | A1* | 7/2010 | Almagro | G06F 17/289 |
| | | | | 704/3 |
| 2010/0185434 | A1* | 7/2010 | Burvall | G06F 17/289 |
| | | | | 704/3 |
| 2010/0235161 | A1* | 9/2010 | Kim | G10L 13/00 |
| | | | | 704/3 |

(Continued)

*Primary Examiner* — Andrew C Flanders
(74) *Attorney, Agent, or Firm* — The Keys Law Firm PLLC

(57) ABSTRACT

An interpreting assistant system which provides to a user captions of auditory communications in the user's vicinity. The interpreting assistant system includes a smart microphone transmitter that defines an input device which converts auditory communications into audio signals and transmit the signals a translation device, with a smart phone defining the translation device which generates a text transcript from the audio signals and send the transcript file to a display device, with the display device being defined by a wearable display interface which displays the transcript for a user to see. When in use, the interpreting assistant system provides for the display of a real time transcription and display of auditory communications such as spoken words for a user that may have hearing difficulties.

18 Claims, 6 Drawing Sheets

(56) References Cited

U.S. PATENT DOCUMENTS

| | | | |
|---|---|---|---|
| 2013/0211818 A1* | 8/2013 | Sakannoto | G10L 15/22 704/2 |
| 2013/0289971 A1* | 10/2013 | Parkinson | G10L 15/26 704/2 |
| 2015/0051898 A1* | 2/2015 | Cuthbert | G06F 3/167 704/3 |
| 2016/0248899 A1* | 8/2016 | Lee | G06F 3/04842 |
| 2016/0357728 A1* | 12/2016 | Bellegarda | G06F 17/275 |
| 2017/0091612 A1* | 3/2017 | Gruber | G06F 3/04842 |
| 2018/0047395 A1* | 2/2018 | Sommers | G06F 17/241 |

* cited by examiner

INTERPRETING ASSISTANT SYSTEM

CROSS REFERENCE TO RELATED APPLICATIONS

This application claims the benefit of and incorporates by reference U.S. provisional patent application Ser. No. 62/604,022 filed Jun. 21, 2017.

BACKGROUND OF THE INVENTION

Field of the Invention

This invention relates generally to a communication assisting system and, more particularly, to a communication assisting system which facilitates a real time visual presentation of auditory communications, particularly language based auditory communications.

Description of the Prior Art

Hearing difficulties affect huge numbers of people throughout the world. It is believed that in the United State alone, there are approximately 1,000,000 people over five years of age who are functionally deaf and about 8,000,000 people above five years of age are hard of hearing. And clearly, having a level of hearing impairment can significantly affect one's ability to communicate with others effectively.

It is generally held that people with a hearing loss greater than 60 decibels may struggle to interact with other people. Even with a hearing aid or a cochlear implant, such individuals may struggle to understand spoken words and depend on lip-reading because of their hearing difficulties. But still, many hearing impaired people do not know how to lip-read, and many do not know sign language. So whether it be in personal conversations in daily living or in a business setting, the provision of equal hearing access remains elusive in many social interactions.

Accordingly, there remains a need for an interpreting system which assists individuals with hearing difficulties by providing captions of auditory communications in real time. It would be desirable if such an interpreting assistant system operated to direct captions to a discrete or an integrated display device. It would be additionally desirable for such an interpreting assistant system to be able to display captions relating to auditory communications in one's environment that it is transcribing in real time or which is being provided in real time as a wireless audio signal.

The Applicant's invention described herein provides for an interpreting assistant system for providing to a user captions of auditory communications in the user's vicinity. The primary components of Applicant's interpreting assistant system are an input device, a translation device and a display device. When in operation, the interpreting assistant system enables the real time transcription and display of auditory communications such as spoken words in a user's vicinity. As a result, many of the limitations not addressed by prior art structures are removed.

SUMMARY OF THE INVENTION

An interpreting assistant system which comprises a primary input device having a microphone adapted to generate audio signals from auditory communication, and a wireless networking interface adapted to communicate electrical signals wirelessly; wherein said primary input device is configured to transmit the audio signals wirelessly; a translation device having at least one translation device wireless networking interface adapted to receive the audio signals transmitted by the primary input device and a processor configured to generate a text transcription which corresponds to words in the audio signals received by the translation device; and a display interface adapted to display text visually, wherein said translation device is configured to transmit the text transcription to the display interface.

It is an object of this invention to provide an interpreting assistant system which assists individuals with hearing difficulties by providing captions of auditory communications in real time.

It is another object of this invention to provide an interpreting assistant system which operates to direct captions to a discrete or an integrated display device.

It is yet another object of this invention to provide an interpreting assistant that is able to display captions relating to auditory communications in one's environment that it is transcribing in real time or which is being provided in real time as a wireless audio signal.

These and other objects will be apparent to one of skill in the art.

DETAILED DESCRIPTION OF THE INVENTION

Figure 1:
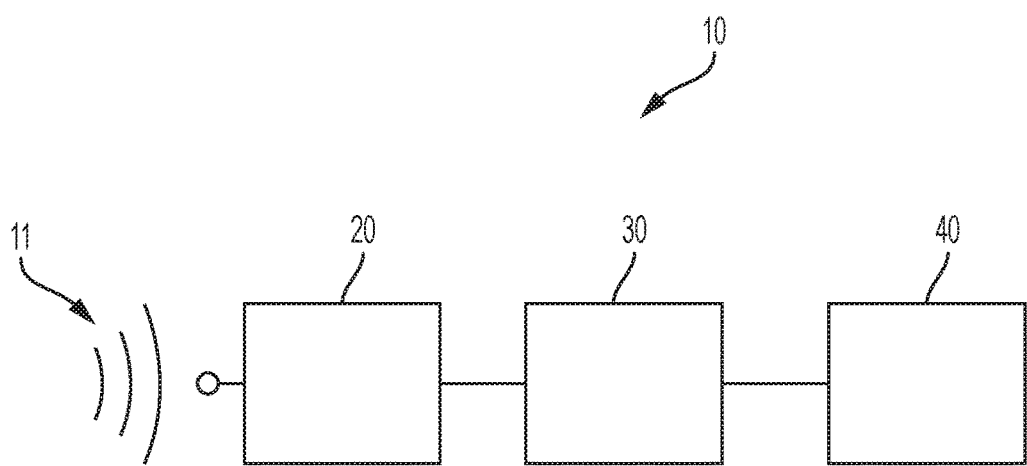
FIG. 1 is a block diagram showing the electrical signal flow through the primary operational components of an interpreting assistant system built in accordance with the present invention.

Referring now to the drawings and in particular FIG. 1, an interpreting assistant system 10 employs, in one embodiment, an input device 20 which receives auditory communications 11 in the form of sound and/or an electrical signal, a translation device 30 which generates and/or formats captions which correspond to the auditory communication received by the input device 20, a display device 40 which displays the captions from the translation device 30. As discussed in greater detail below, while in any embodiment the input device 20, translation device 30 and the display device 40 remain electrically connected so as to facilitate the communication of electrical signals between them, in different embodiments, the input device 20, translation device 30 and the display device 40 may be housed together in a single housing or apart in two or three different housings.

Figure 2:
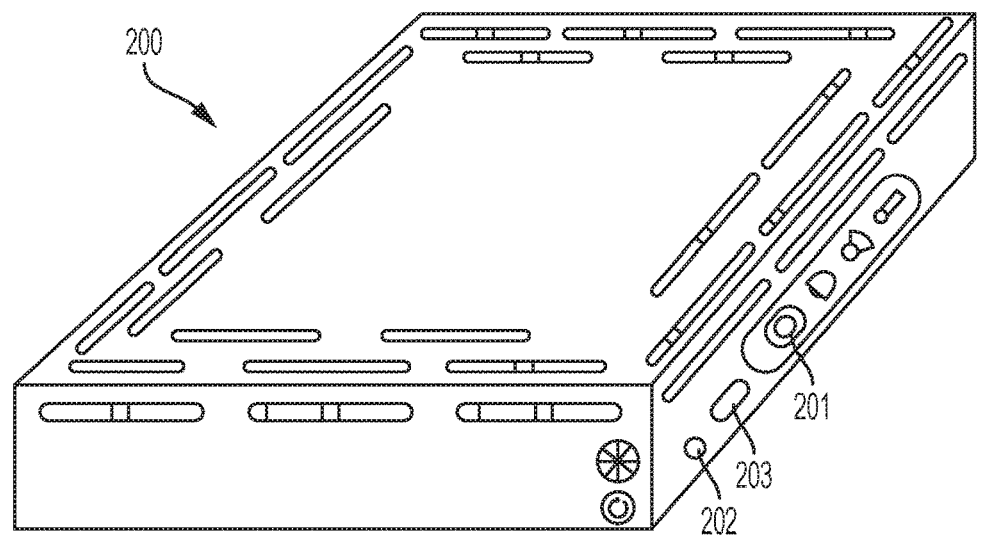
FIG. 2 is a side perspective view of a microphone transmitter housing embodying an input device of an interpreting assistant system built in accordance with the present invention.

Referring now to FIG. 2, a smart microphone transmitter 200 defining an input device of the interpreting assistant system is shown. The smart microphone transmitter 200 includes a controller, wireless networking interface, an antenna, and battery as interconnected internal components, as well as a microphone that is connected to the wireless networking interface so as to allow audio signals created by the microphone (that are converted from auditory communication) to be transmitted to a discrete translation device over a wireless network.

In one embodiment, the microphone directly outputs a digital audio signal. In other embodiments in which the microphone outputs an analog signal, an analog to digital converter is included in the smart microphone transmitter 200 in order to convert analog audio signals created by the microphone to digital signals.

In one embodiment, the microphone is defined by a directional microphone 201 which operates to enhance sound coming from a target direction relative to the smart microphone transmitter 200 (based on the present orientation of the smart microphone transmitter 200) and to diminish background noise.

In one embodiment, the wireless networking interface is defined by a Bluetooth interface. In this regard, it is appreciated that the audio signals created by the microphone may be transmitted over a Bluetooth connection to a translation device that also includes a Bluetooth interface and that has been paired with the smart microphone transmitter 200.

In one embodiment, the antenna is defined by a radio frequency ("RF") antenna. In operation, the antenna enables the smart microphone transmitter 200 to receive a wireless RF signal which correspond to audio signals representing auditory communication in the vicinity of the smart microphone transmitter 200. Such signals can then be sent to a translation device over the wireless networking interface. In some embodiments, such signals could come from other input devices of the interpreting assistant system, such as the microphone clip described below. In other embodiments, however, this RF antenna could be utilized in a public place which desires to provide equal hearing access to visitors at an effective cost in a manner such as that described below.

For example, for a public place desiring to provide equal hearing access to its visitors, the instant invention enables them to do so efficiently. In such a circumstance, the operator would merely (1) install an RF transmitter which broadcasts audio signals corresponding to any selected auditory communication being broadcast at the location from an in building transmitter and (2) post the RF frequency of the broadcast. In such a scenario, any visitor having a smart microphone transmitter 200 built in accordance with the present invention could simply set the RF antenna on their smart microphone transmitter 200 to the correct frequency to receive the broadcast, with the smart microphone transmitter 200 the directing those signals to a translation device over the wireless networking interface. Indeed, if the smart microphone transmitter 200 is positioned in a movie theatre, the movie theatre can broadcast on a designated RF channel audio signals representing auditory communication in the movie and the smart microphone transmitter 200 and pick these signals up and send them to a translation device.

In one embodiment, the smart microphone transmitter 200 may additionally include an audio input port 202 to receive audio signals in the manner described in the preceding paragraph over a physical connector and/or a USB port 203 to receive audio signals and/or electrical power.

Figure 3:
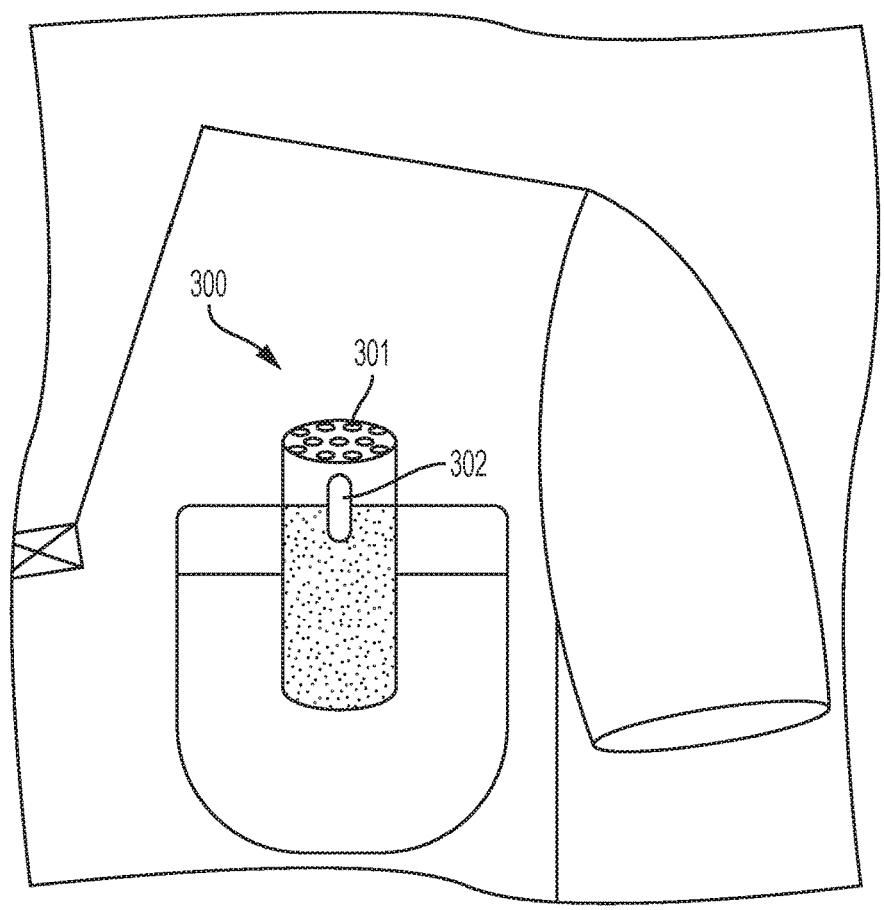
FIG. 3 is a front elevational view of a micro clip housing embodying an input device of an interpreting assistant system built in accordance with the present invention.

Referring now to FIG. 3, a microphone clip 300 defining an input device of the interpreting assistant system is shown. In one embodiment, the microphone clip 300 includes an internal controller, an antenna, and a power source, as well as a microphone 301 and operates as a supplemental input device in conjunction with the smart microphone transmitter. The microphone clip includes an attachment device, such as a biased clip 302, to allow it to be releasably coupled onto or adjacent to a target speaker. In one embodiment, the antenna is defined by an RF antenna. In this regard, the microphone clip 300 operates to convert auditory communication into audio signals and send those audio signals over the antenna to the smart microphone transmitter. Because of its proximity to the target speaker, however, a comparison of the audio signals from the microphone clip 300 with those picked up by the smart microphone transmitter enables the translation device to identify the speaking of the target speaker and distinguish communication from the target from the speaking of other speakers in the area so as to distinguish the transcription of the target speaker's speaking when the transcription is displayed (but still display transcriptions of the speaking of the other speakers). It is appreciated that in settings like a classroom, such functionality would enable a student to particularly note what an instructor (wearing the microphone clip 300) was saying but also follow what discussion or questions may be directed at the instructor.

It is appreciated that in one embodiment, distinguishing communication from the target from the speaking of other speakers in the area is performed using conventional multi-microphone techniques for analyzing spatial information about the relative position of competing sound sources, with the understanding that the microphone clip 300 would be the target (primary) sound source and all others would be secondary sources to be distinguished therefrom.

In one embodiment, distinguishing communication may be performed to distinguish auditory communication picked up by the smart microphone transmitter from audio signals received by the smart microphone transmitter over its antenna.

Figure 4:
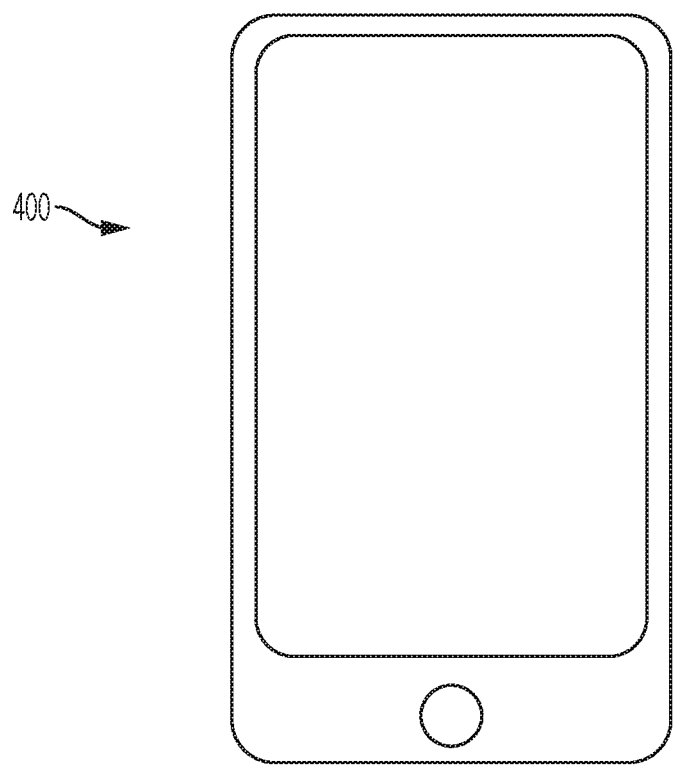
FIG. 4 is a top plan view of a smart phone embodying a translation device of an interpreting assistant system built in accordance with the present invention.

Referring now to FIG. 4, a smart phone 400 defining a translation device of the interpreting assistant system is shown. In accordance with the presenting invention, the smart phone 400 includes at least a processor, memory, and a wireless networking interface, with the memory containing instructions embodied as transcription software that causes the processor to generate a text transcription from audio signals which are received from the smart microphone transmitter and send the text transcription to a display device. The memory may also include instructions embodied as formatting software that causes the processor to format a generated text transcription for use by a display device, including to change the size and color of the transcription.

It is contemplated that the smart phone's 400 wireless networking interface defines in one embodiment a Bluetooth interface so as to allow the smart phone 400 to receive audio signals from an input device that is paired with the smart phone 400, such as a smart microphone transmitter, as well as to allow the smart phone 400 to send the text transcription as computer readable data to a display device that has been paired with the smart phone 400.

Figure 5:
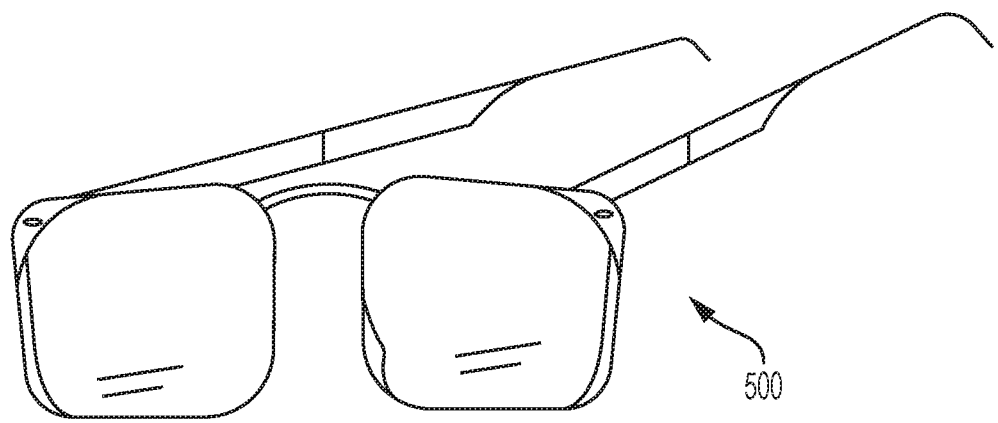
FIG. 5 is a front perspective view of a pair of smart glasses embodying a display device for an interpreting assistant system built in accordance with the present invention.

Referring now to FIG. 5, a pair of wearable smart glasses 500 defining a display device of the interpreting assistant system is shown. In one embodiment, the wearable smart glasses 500 are defined by conventional wearable computer glasses which superimpose information onto a wearer's field of view. In one embodiment, the wearable smart glasses 500 in accordance with the present invention may employ holographic optics.

The wearable smart glasses 500 include a wireless networking interface operative to receive electrical signals from the smart phone's wireless networking interface. In one embodiment, the wearable smart glasses' 500 wireless networking interface defines a Bluetooth interface. In this regard, the wearable smart glasses 500 may operate as a display device by receiving a signal over their Bluetooth interface from a paired smart phone that includes a text transcription and then displaying this text transcription on a wearer's field of view.

Figure 6:
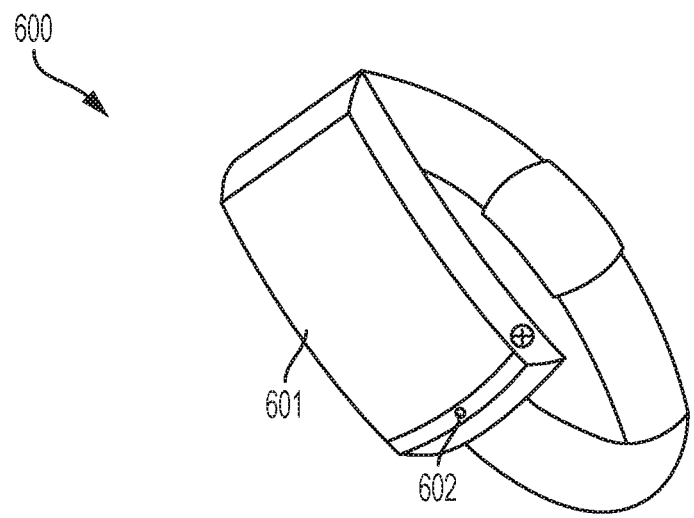
FIG. 6 is a top perspective view of a smart watch embodying a display device of an interpreting assistant system built in accordance with the present invention.

Referring now to FIG. 6, a smart watch 600 defining a display device of the interpreting assistant system is shown. In one embodiment, the smart watch 600 is defined by conventional wrist wearable mobile device that includes a visual display interface that is defined by a display screen 601. The smart watch 600 includes a wireless networking interface operative to receive electrical signals from the smart phone's wireless networking interface. In one embodiment, the smart watch's 600 wireless networking interface defines a Bluetooth interface. In this regard, the smart watch 600 may operate as a display device by receiving a signal over their Bluetooth interface from a paired smart phone that includes a text transcription and then displaying this text transcription on the visual display interface.

In one embodiment, the smart watch 600 also includes a microphone 602 that is connected to its wireless networking interface, as well as capture software which causes the microphone to generate audio signals from auditory communication that is picked up and then transmit the audio signals to the smart phone configured as a translation device where they can be transcribed and returned to the smart watch 600.

Figure 7:
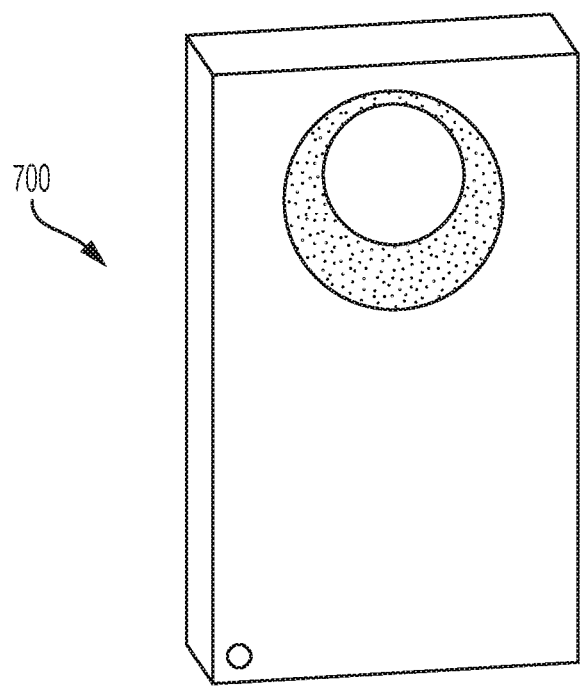
FIG. 7 is a front perspective view of a video transmitter housing embodying an input device of an interpreting assistant system built in accordance with the present invention.

Referring now to FIG. 7, a sign transmitter 700 which includes an antenna, and power source as interconnected internal components whose operation is controlled by an internal controller, as well as a camera that is connected to the controller is shown. In one embodiment, the sign transmitter 700 includes sign software which enables it to convert sign language signs, such as American Sign Language signs, which are picked up the camera and convert them to audio signals which correspond to the letters or words that were signed in from of the camera. In one embodiment, these audio signals are then transmitted through the antenna to a broadcasting device having an antenna and a speaker to be played over the speaker. In one embodiment, a smart microphone transmitter built in accordance with the present invention and that also includes a speaker is employed as the broadcasting device. Advantageously, such a configuration enables the smart microphone transmitter, when operating with the sign transmitter 700, to initiate the transcription of auditory communication for display for a hearing impaired user as well as output sound that has been converted from the hearing impaired user's signing.

It is contemplated that the interpreting assistant system in some embodiments may also operate with a Braille transmitter (not shown) for the deafblind. In one embodiment, the Braille transmitter can be connected to a smart microphone transmitter, smart phone, or an in building transmitter. In operation, the smart microphone transmitter will pick up verbal communication and either transmit it to the smart phone or send it automatically to the Braille transmitter for the user. If the portable microphone transmitter sends it to the smart phone, the smart phone will translate and transmit the communication to the Braille transmitter which then provide Braille notation.

In one embodiment, the Braille transmitter will also allow the deafblind to input what they want to say. The text will be sent to the smart phone and the smart phone will translated it to audio and transmit it to the smart microphone transmitter to voice it out.

Figure 8:
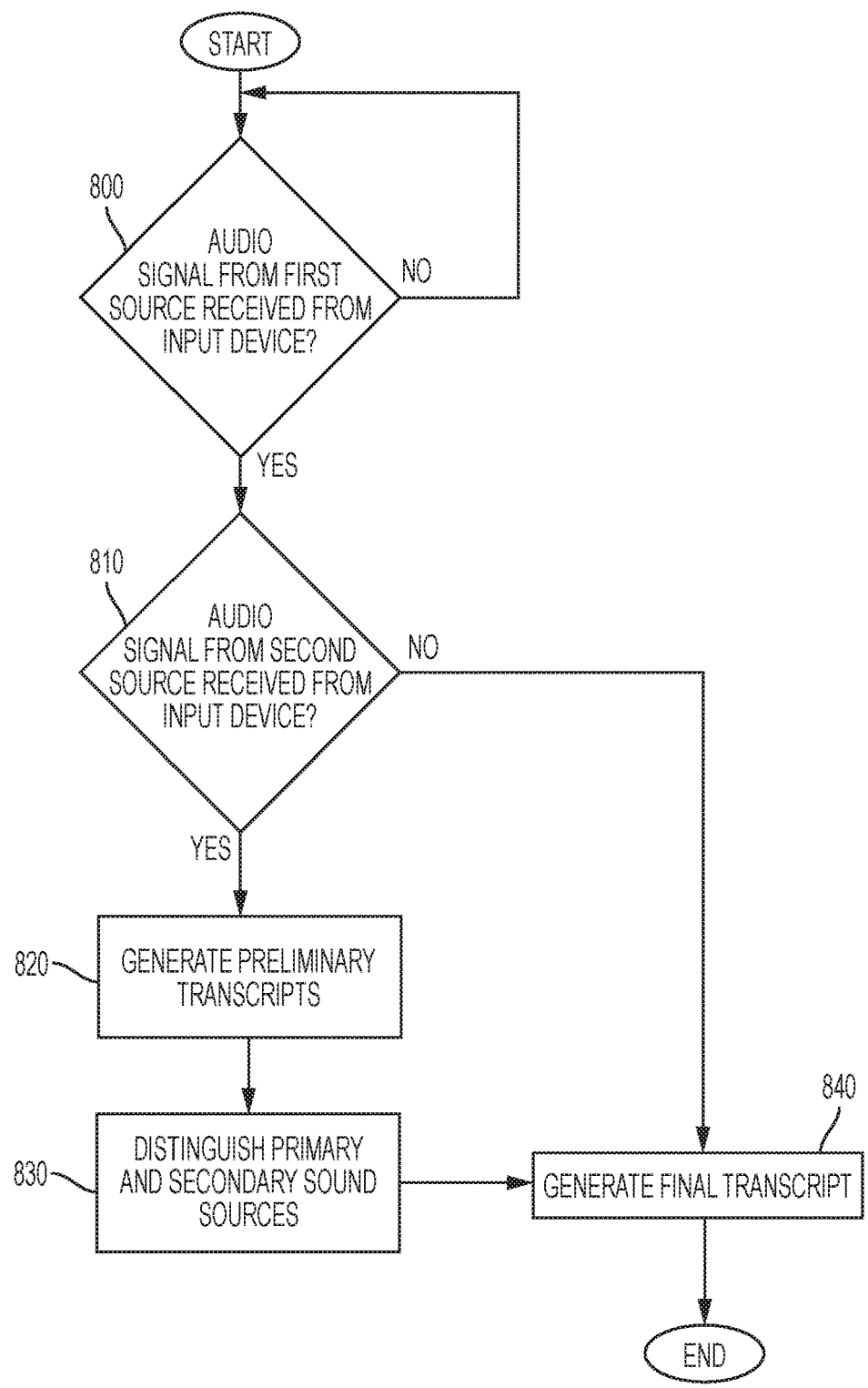
FIG. 8 shows the process through which a text transcription file is generated in an interpreting assistant system built in accordance with the present invention.

Referring now to FIG. 8, the process through which transcription software causes a text transcription to be generated begins with the receipt of an audio signal 800. If the audio signal is from an input device, such as the smart microphone transmitter, the translation device checks to see if there is also an audio signal from a second device being sent from the input device 810. It is appreciated that the metadata in the audio signal would identify the specific source or at least whether there was a first and a second source (as opposed to one source). If audio signals from two sources are received, preliminary transcripts are generated 820 and, then, using the preliminary transcripts, the transcribed text from the differing sources is distinguished by way of the way it will appeared when displayed 830 (such as assigning a different color or font to the text based on the source). Once the text is distinguished, a final transcript is generated which incorporates the distinct assigned appearance.

It is appreciated that while a different font or color is assigned at this stage, it will be the display device which actually implements this distinguishing assignment when it renders the text on a display.

If no audio signal is received from an input device, the translation device simply generates a final transcript 840.

It is contemplated that the formatting of transcripts for display will include preparing a transcript to be shown line by line or as a rolling output on a paired connected device. For example, if wearable smart glasses have been paired as the display device, formatting may include preparing the transcript to be shown line by line while if a smart watch has been paired as the display device, formatting may include preparing the transcript to be shown a rolling output.

It is contemplated that the interpreting assistant system may be employed to translate and display in any number of spoken, written, and signed languages.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An interpreting assistant system, comprising:
    a primary input device having a microphone adapted to generate audio signals from auditory communication, an antenna adapted to receive wirelessly a radio transmission which contains audio signals representing auditory communication, and a wireless networking interface adapted to transmit audio signals generated by the microphone of the primary input device and audio signals received by the antenna wirelessly;
    a translation device having at least one translation device wireless networking interface adapted to receive the audio signals transmitted by the wireless networking interface of the primary input device and a processor configured to generate a text transcription which corresponds to words in the audio signals received by the translation device;

wherein said antenna is configured to receive the radio transmission from a source other than the translation device; and a display interface adapted to display text visually, wherein said translation device is configured to transmit the text transcription to the display interface.

2. The interpreting assistant system of claim 1, additionally comprising a secondary input device having at least a microphone adapted to generate audio signals from auditory communication and a wireless networking interface adapted to transmit audio signals generated by the microphone of the secondary input device to the translation device wirelessly.

3. The interpreting assistant system of claim 2, wherein said processor of said translation device, when generating the text transcription which corresponds to words of the auditory communication in the audio signals received by the translation device, is additionally configured to distinguish in the text translation between text translated from audio signals generated by the microphone of the primary input device and text translated from audio signals generated by the microphone of the secondary input device.

4. The interpreting assistant system of claim 1, wherein said display interface is defined by a discrete display device and said translation device is configured to transmit the text transcription to the display interface wirelessly.

5. The interpreting assistant system of claim 4, wherein said discrete display device is defined by a smart watch.

6. The interpreting assistant system of claim 4, wherein said discrete display device is defined by a pair of wearable smart glasses.

7. The interpreting assistant system of claim 1, wherein said translation device is defined by a mobile computer device.

8. The interpreting assistant system of claim 7, wherein said primary input device and said translation device are adapted to wirelessly pair, thereby allowing said translation device to receive the audio signals transmitted by the primary input device wirelessly.

9. The interpreting assistant system of claim 1, wherein said processor of said translation device, when generating the text transcription which corresponds to words of the auditory communication in the audio signals received by the translation device, is additionally configured to distinguish in the text translation between text translated from audio signals generated by the microphone of the primary input device and text translated from audio signals received by the antenna.

10. The interpreting assistant system of claim 3, wherein said processor of said translation device, when generating the text transcription which corresponds to words of the auditory communication in the audio signals received by the translation device, is additionally configured to distinguish in the text translation between text translated from audio signals generated by the microphone of the primary input device and text translated from audio signals received by the antenna.

11. An interpreting assistant system, comprising:

a primary input device having a microphone adapted to generate audio signals from auditory communication, an antenna adapted to receive wirelessly a radio transmission which contains audio signals representing auditory communication, and a wireless networking interface adapted to transmit audio signals generated by the microphone of the primary input device and audio signals received by the antenna wirelessly;

a translation device having at least one translation device wireless networking interface adapted to receive the audio signals transmitted by the wireless networking interface of the primary input device and a processor configured to automatically generate a text transcription which corresponds to words in the audio signals received by the translation device;

wherein said antenna is configured to receive the radio transmission from a source other than the translation device;

a secondary input device having at least a microphone adapted to generate audio signals from auditory communication and a wireless networking interface adapted to transmit audio signals generated by the microphone of the secondary input device to the translation device wirelessly;

a display interface adapted to display text visually, wherein said translation device is configured to transmit the text transcription to the display interface; and wherein said display interface is defined by a discrete display device and said translation device is configured to transmit the text transcription to the display interface wirelessly.

12. The interpreting assistant system of claim 11, wherein said processor of said translation device, when generating the text transcription which corresponds to words of the auditory communication in the audio signals received by the translation device, is additionally configured to distinguish in the text translation between text translated from audio signals generated by the microphone of the primary input device and text translated from audio signals generated by the microphone of the secondary input device.

13. The interpreting assistant system of claim 11, wherein said discrete display device is defined by a smart watch.

14. The interpreting assistant system of claim 11, wherein said discrete display device is defined by a pair of wearable smart glasses.

15. The interpreting assistant system of claim 11, wherein said translation device is defined by a mobile computer device.

16. The interpreting assistant system of claim 11, wherein said primary input device and said translation device are adapted to wirelessly pair, thereby allowing said translation device to receive the audio signals transmitted by the primary input device wirelessly.

17. The interpreting assistant system of claim 11, wherein said processor of said translation device, when generating the text transcription which corresponds to words of the auditory communication in the audio signals received by the translation device, is additionally configured to distinguish in the text translation between text translated from audio signals generated by the microphone of the primary input device and text translated from audio signals received by the antenna.

18. The interpreting assistant system of claim 12, wherein said processor of said translation device, when generating the text transcription which corresponds to words of the auditory communication in the audio signals received by the translation device, is additionally configured to distinguish in the text translation between text translated from audio signals generated by the microphone of the primary input device and text translated from audio signals received by the antenna.

* * * * *